April 12, 1932.  L. JAENICHEN  1,853,618

SCALE

Filed Oct. 20, 1926  2 Sheets-Sheet 1

INVENTOR.
Louis Jaenichen
BY Francis D. Hardesty
ATTORNEY.

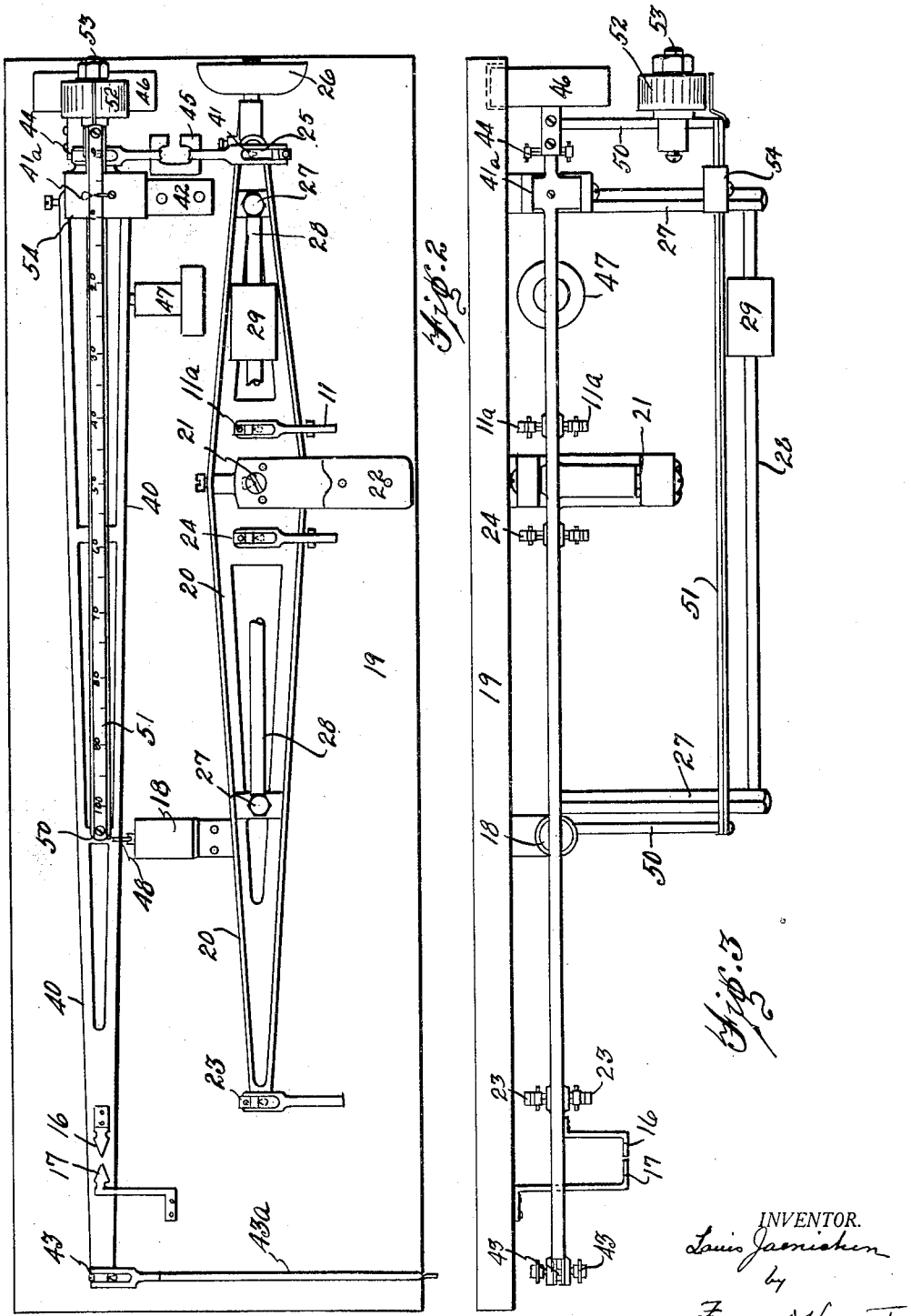

Patented Apr. 12, 1932

1,853,618

UNITED STATES PATENT OFFICE

LOUIS JAENICHEN, OF SPRINGFIELD TOWNSHIP, OAKLAND COUNTY, MICHIGAN, ASSIGNOR TO THE STANDARD COMPUTING SCALE COMPANY, OF DETROIT, MICHIGAN, A CORPORATION OF MICHIGAN

SCALE

Application filed October 20, 1926. Serial No. 142,822.

The present invention relates to scales and particularly to scales adapted to indicate the count of the number of articles comprised in a bulk quantity containing an unknown number.

This invention also relates to weighing and counting scales, particularly of the type employing load-counterbalancing and indicating mechanism which is brought to a predetermined position when the load on the platform is counterbalanced by specimens of the same article.

In scales of this type, in which the ratio between the leverage of the lot of articles to be counted and the leverage of the specimens by which the lot is counterbalanced is fixed, it is necessary to count by hand the number of articles by which the lot exceeds an even hundred, or even fifty, or twenty-five, the average number which it is necessary to count by hand depending upon whether the ratio of the leverage of the specimens and the leverage of the lot to be counted is 100 to 1, 50 to 1, or 25 to 1.

It is an object of this invention to provide means whereby the number which it is necessary to count by hand is reduced to a minimum, and specifically to provide means whereby the number that it is necessary to count by hand is reduced to less than ten.

Another object of the invention is to provide a counting scale which is particularly adapted for use in connection with the making of clerical records of counts.

Another object is the provision of means whereby a weighing scale of standard construction can be converted into a counting scale of the fixed ratio pan type in which the necessary hand count is reduced to a minimum and which is particularly adapted for use in connection with the making of clerical records of counts.

Among the objects of the invention is a more simple and efficient device for accurately and quickly determining the number of articles in a bulk quantity than those heretofore suggested.

Another object is mechanism for counting that is also adapted to platform weighing.

Other objects include improvement in details of construction and operation.

Still other objects will readily occur to those skilled in the art upon reference to the following description and accompanying drawings in which:—

Fig. 2 is a side elevation of the counting levers;

Fig. 3 is a top plan view of the same;

Figure 1:
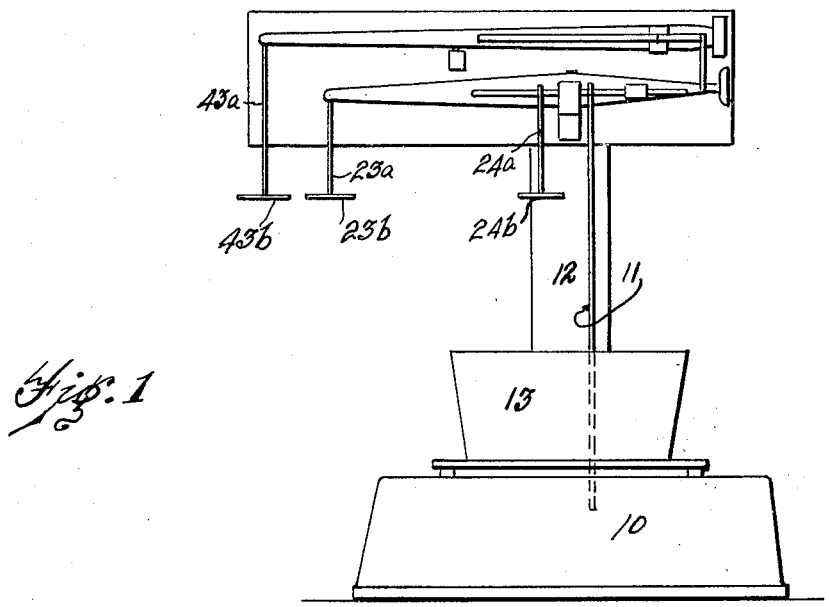
Fig. 1 is a diagrammatic representation showing the counting scale levers and beams as applied to a platform scale.

In the drawings, 10 indicates a scale platform or commodity receiver and support of conventional design having therein the usual arrangement of platform levers, a free end of one of which is connected in the usual manner by a link 11 extending up through column 12 to the counting levers. 13 indicates a conventional scoop or tray resting on the platform. The usual lever arrangement in the base will be of 10 to 1 ratio.

The arrangement of the counting levers is shown best in Figs. 2 and 3. There are in the present device two counting levers 20 and 40. The former lever 20 will be supported by a suitable knife edge or other bearing at 21 in a yoke 22 carried by a back plate or frame 19 which is in turn supported upon column 12. Lever 40 will be supported at 41 in a yoke 42 also carried by a plate on frame 19. The frame 19 will also support if desired a dash pot 18 and a pointer 17.

The lever 20, in addition to the bearings mentioned, will also be provided with three other bearings 23, 24 and 25. Bearings 23 and 24 will be on the other side of bearing 21 from the bearing 11a for link 11, that is, on the long end of the lever while bearing 25 will be on the same side, that is, the short end, and more remote. The bearings 23 and 24 will support through links 23a and 24a counting or ratio pans 23b and 24b. At bearing 25 the lever 20 is connected through suitable links to the short end of lever 40.

The lever 20 will have a suitable adjusting weight 26 and preferably is also provided with laterally extending arms 27 carrying a rod 28 upon which is slidably mounted a counterpoise 29 for the scoop 13. The rod 28 is preferably sufficiently long on either side of the scoop, balancing position to provide for counterbalancing without the scoop or for counterbalancing other containers of less or more weight than the scoop. Lever 40 is also provided with two bearings 43 and 44 in addition to bearing 41a. Bearing 43 is at the extremity of the long end of the lever and carries link 43a supporting counting or ratio pan 43b. Bearing 44 is on the short end and supports the short end of lever 20 through link 45 and bearing 25. This lever 40 will be provided with an adjusting weight 46 for horizontal adjustment and there may also be and preferably is a connection 48 from the lever to a dash pot 18 to dampen the movement of the levers.

Lever 40 will also have laterally extending arms 50 carrying a beam 51 graduated and notched to indicate "pounds" and carrying a sliding poise 54. At the one end of this beam may be a graduated wheel poise 52 threaded on a rod 53 adapted to indicate "ounces". The beam 51 and wheel poise 52 are provided to permit obtaining weights in addition to or without the function of counting about to be described more in detail.

The form of scale shown is designed primarily as a counting scale and is designed to count the articles using the decimal system. However, it should be noted that by making the proper changes in divisions of leverage other systems may be used, for example, the counting by dozens and gross.

In the design shown, and using the 10 to 1 lever ratio in the platform base, the lever arm lengths for the counting levers will be as follows:

From bearing 21 to bearing 11a the distance will be ten units of length, for example, 1.250 inches;

From bearing 21 to bearing 24 the distance will be nine units, for example, 1.125 inches;

From bearing 21 to bearing 23, the distance will be ninety-nine units, for example, 12.375 inches;

From bearing 21 to bearing 25, the distance will be forty-five units, for example, 5.625 inches;

From bearing 41a to bearing 44, the distance will be eight units, for example, 1.00 (one) inch;

From bearing 41a to bearing 43, the distance will be one hundred and seventy seven and six tenths (177.6) units, for example, 22.2 inches.

With these dimensions, a single article in counting pan 24b will balance nine like articles in scoop 13 on the platform; a single article in counting pan 23b will balance ninety-nine like articles in scoop 13; and a single article in counting pan 43b, nine hundred and ninety-nine like articles in scoop 13. It will therefore be quite simple to obtain the count of the number of articles in a bulk lot; to do so place the lot in scoop 13 and then remove therefrom a few articles and distribute same by trial in counting pans 43b, 23b and 24b finally if necessary removing and withholding from scoop 13 less than ten articles as required to balance the lot on the scale; these less than ten articles withheld from and not used on the scale will equal and indicate the number to be used as the unit figure of the total number of articles.

Taking as an example a bulk lot known to contain 3864 articles.

The balance will be found when there are three articles in counting pan 43b, indicating 3 thousand, eight articles in counting pan 23b, indicating 8 hundred, six articles in counting pan 24b, indicating 6 tens, with four articles taken from scoop 13 and not used in any of the pans manually counted to ascertain the unit figure 4 of the total 3864 articles in the example lot.

As an aid in balancing, a pointer 17 is secured to the stationary frame or back plate 19 with another pointer 16 fixed to the long end of lever 40. If it is desired to use the platform without the scoop 13, the weight 29 is moved to the right end of the rod 28. If it is desired to use another container in addition to scoop 13, or a container heavier than scoop 13, the weight 29 is moved to the left on rod 28 to balance the scale before counting.

Having now described the invention and the preferred form of embodiment thereof, it is to be understood that the said invention is not to be limited to the specific details herein described and shown but only by the scope of the claims which follow.

I claim:—

1. A counting scale comprising a pair of scale levers pivoted on a frame, a load receiver, a link connecting the short arms of said levers, a connection between the short arm of one of the levers and the load receiver, counting pans connected to the long arms of said levers for removing load fractions, and weight indicators carried upon one of said levers, said lever arms being so proportioned that one unit in one counting pan will balance a predetermined number of units in the load receiver and one unit in the other pan will balance a different predetermined number of units in the load receiver.

2. A platform counting scale comprising a load platform, a supporting base therefor having therein a lever system carrying said platform and a column through which extends a beam actuating link, a frame supported by said column and having pivoted thereon a pair of levers, a bearing connection for said actuating link on the short arm of the lower lever, two counting pans suspended in spaced relation on the long arm of said lower lever, a link connection between the short arms of said levers, and a counting pan suspended from the long arm of the upper lever, said lever arms being of such lengths and said bearings being so located that a single article in any of said counting pans will balance a predetermined number of like articles on said platform, and a single article in another of said counting pans will balance a different predetermined number of like articles on said platform.

3. A counting scale comprising a load platform, a supporting base therefor having compound levers therein and a column at one end through which extends a beam actuating link, a frame supported by said column and having pivoted thereon a pair of counting levers, one above the other, a bearing connection for said actuating link on the short arm of the lower counting lever, two counting pans suspended in spaced relation on the long arm of the lower counting lever, a link connection between the short arms of said counting levers and a counting pan suspended from the long arm of the upper lever, said counting lever arms being of such lengths and said bearings being so located that a single article in one of said counting pans will balance a predetermined number of like articles on said platform and a single article in another of said pans will balance a different predetermined number of like articles on said platform.

4. In a device of the class described, in combination, a commodity receiver, load-counterbalancing mechanism, means connecting said commodity-receiver to said load-counterbalancing mechanism, said connecting means including a lever, load pivots carried by said lever, one of said load pivots being at a substantially greater distance from the fulcrum of said lever than the other, and ratio pans supported by said load pivots.

5. In a device of the class described, in combination, a commodity-receiver, load-counterbalancing mechanism, means connecting said commodity-receiver to said load-counterbalancing mechanism, said connecting means including a lever, load pivots carried by said lever, one of said load pivots being at a substantially greater distance from the fulcrum of said lever than the other, ratio pans supported by said load pivots, and a tare beam carried by said lever.

6. In a device of the class described, in combination, a commodity-receiver, load-counterbalancing mechanism, means connecting said commodity-receiver to said load-counterbalancing mechanism, said connecting means including a lever, and two ratio pans supported by said lever at fixed distances from its fulcrum, the leverage of said commodity-receiver and pans being such that the sum of the number of parts of substantially uniform weight in one of said ratio pans and of the number of similar parts on said commodity-receiver and counterbalanced by those in the pan will be a multiple of 100 and the sum of such parts in the other of said ratio pans and of the parts on the commodity receiver counterbalanced thereby will be a multiple of 10.

7. In a device of the class described, in combination, a commodity-receiver, load-counterbalancing mechanism, means operatively connecting said commodity-receiver and said load-counterbalancing mechanism, said connecting means including a lever, and two ratio pans supported by said lever at such fixed distances from the fulcrum thereof that the sum of the numbers of uniform pieces respectively on said commodity-receiver and in one of said ratio pans, which numbers counterbalances each other, will be a multiple of 100 and the sum of the numbers of such pieces respectively on said commodity-receiver and in the other of said ratio pans and which counterbalance each other, will be a multiple of 10.

8. In a device of the class described, in combination, a commodity-receiver, load-counterbalancing mechanism, means operatively connecting said commodity-receiver and said load-counterbalancing mechanism, said connecting means including a lever, and two ratio pans supported by said lever at such fixed distances from the fulcrum thereof that the ratio of leverage of one of said ratio pans to the leverage of the commodity receiver is 99 to 1 and the ratio of leverage of the other of said ratio pans to the commodity-receiver is 9 to 1.

LOUIS JAENICHEN.